United States Patent [19]

Phillips, Sr.

[11] Patent Number: 4,930,946

[45] Date of Patent: Jun. 5, 1990

[54] CHAMFERING REAMER WITH TRIP SHOULDER

[76] Inventor: Douglas B. Phillips, Sr., 4124 Greenleaf, Spring, Tex. 77389

[21] Appl. No.: 259,893

[22] Filed: Oct. 19, 1988

[51] Int. Cl.$^5$ .............................................. B23B 5/16
[52] U.S. Cl. ..................................... 408/80; 408/211; 408/224
[58] Field of Search ................. 408/80, 139, 211, 223, 408/224, 225, 227, 228, 233, 144, 713; 407/40, 62

[56] References Cited

U.S. PATENT DOCUMENTS

| | | | |
|---|---|---|---|
| 1,753,935 | 4/1930 | Maisch | 408/223 X |
| 2,188,584 | 1/1940 | Tyne | 408/233 X |
| 2,470,392 | 5/1949 | Gassmann | 408/211 X |
| 3,207,196 | 9/1965 | Stillwagon, Jr. | 408/223 X |
| 3,228,268 | 1/1966 | Strout | 408/211 X |
| 3,706,504 | 12/1972 | Simonffy | 408/228 |
| 4,016,614 | 4/1977 | Press | 7/14.1 R |
| 4,134,704 | 1/1979 | Jackley et al. | 408/57 |
| 4,165,201 | 8/1979 | Heule | 408/187 |
| 4,468,829 | 9/1984 | Christensen | 408/211 X |
| 4,682,917 | 7/1987 | Williams, III et al. | 408/212 |

FOREIGN PATENT DOCUMENTS

| | | | |
|---|---|---|---|
| 1073276 | 8/1954 | Fed. Rep. of Germany | 408/224 |
| 2518187 | 11/1976 | Fed. Rep. of Germany | 408/211 |
| 0223519 | 12/1983 | Japan | 408/227 |

Primary Examiner—Z. R. Bilinsky
Attorney, Agent, or Firm—Kenneth A. Roddy

[57] ABSTRACT

A chamfering reamer for reaming the inside diameter of pipe or conduit comprises a generally cylindrical body having a truncated conical forward end to be received within the inside diameter of a pipe or conduit and a rearward end adapted to be secured in a chaser holder of a threading machine and a plurality of longitudinal flutes extending rearwardly from the forward end defining a plurality of circumferentially spaced longitudinal wings. Each wing has a conical reaming portion to ream the interior diameter at the end of the pipe or conduit and a conical trip shoulder extending from the conical reaming portion to the outer surface of each wing to activate the chaser holder to release the chamfered piece and provide clearance between the end surface of the pipe or conduit being reamed. Another embodiment for simultaneously reaming interior and exterior diameters has a body with the above described features which removably receives a hollow cylindrical sleeve having forwardly extending projections in circumferential alignment with the wings. Each projection has a reaming surface extending inward in opposed relation to the conical reaming portion of the wing to form a plurality of rearwardly extending generally V-shaped, angular bottom grooves which simultaneously ream the interior and exterior diameters at the end of the pipe or conduit. Another embodiment has replaceable inserts on the leading edge of the wing portions.

23 Claims, 3 Drawing Sheets

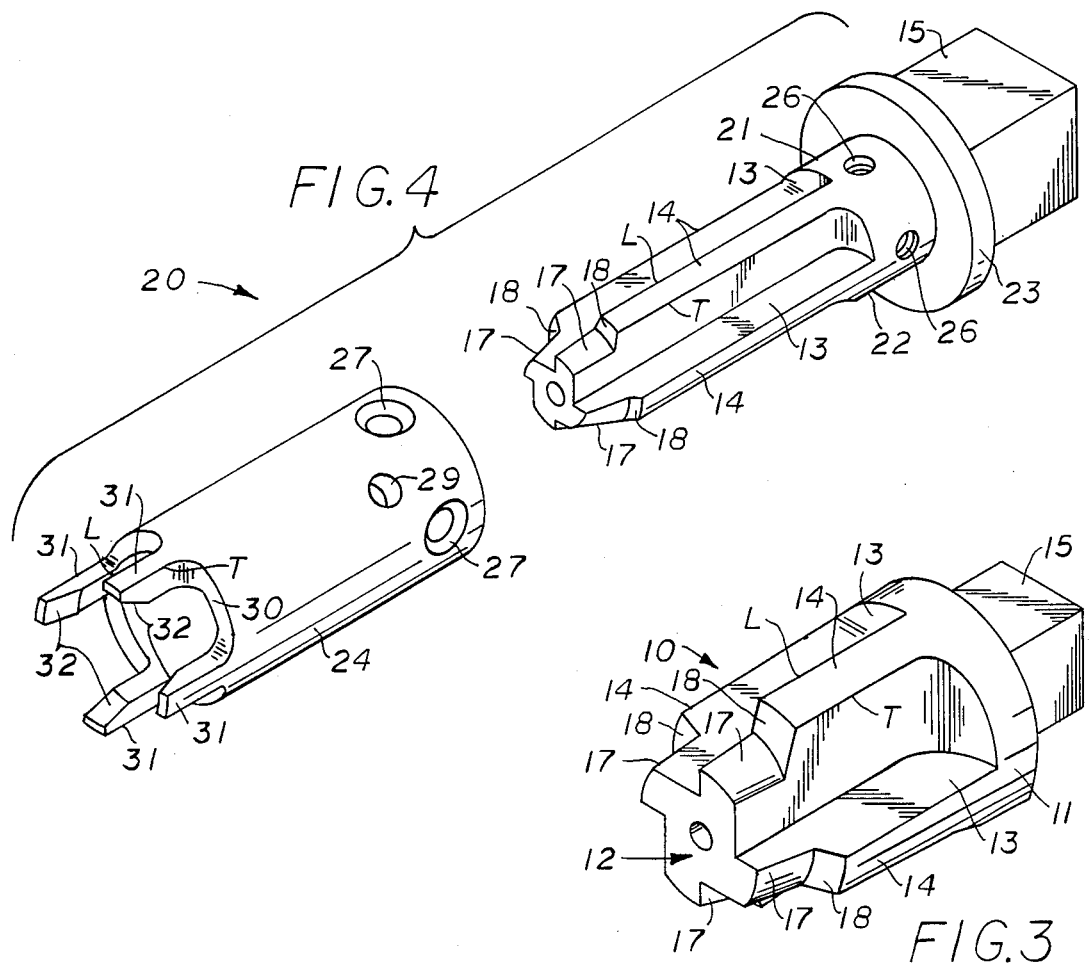
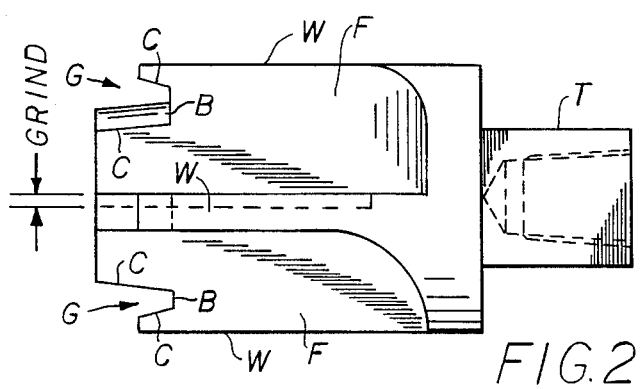
FIG. 2 (PRIOR ART)
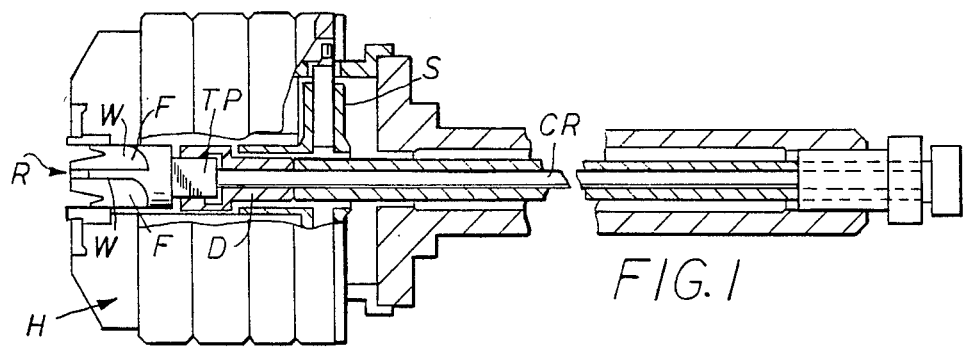
FIG. 1

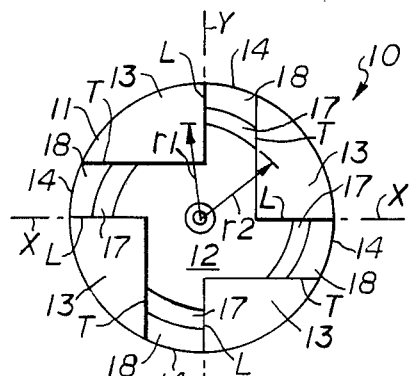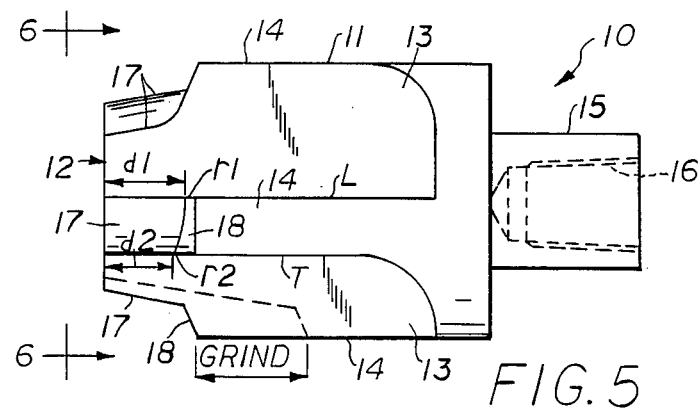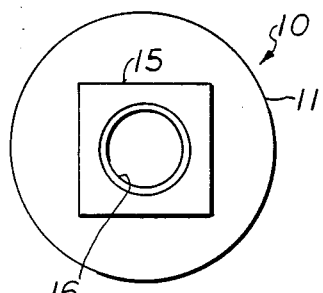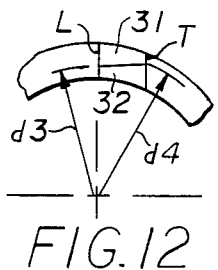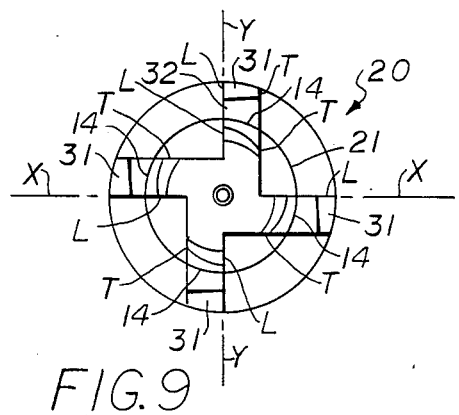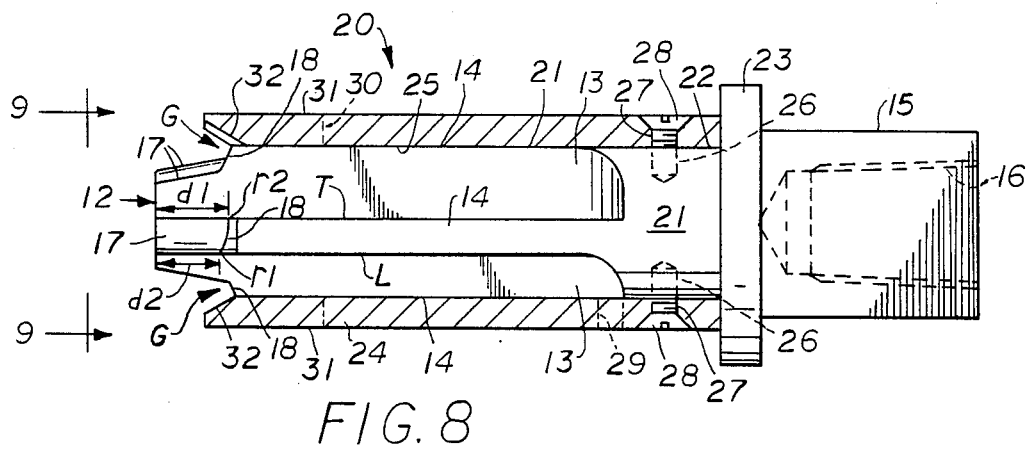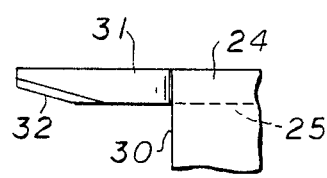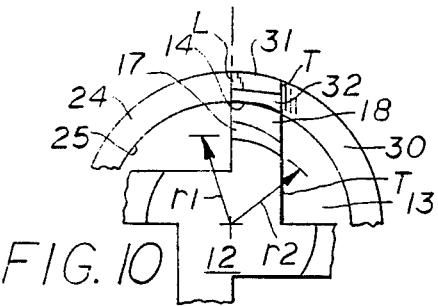

CHAMFERING REAMER WITH TRIP SHOULDER

BACKGROUND OF THE INVENTION

1. Field of the Invention

This invention relates generally to reamers, and more particularly to a chamfering reamer for threading machines which chamfers the interior and/or exterior of the threaded end of pipe or conduit and has a trip shoulder for activating a chaser holder of the threading head upon completion of the threading and chamfering operation to release the chamfered piece.

2. Brief Description of the Prior Art

Chamfering reamers are secured by an adjustable draw bar in the threading head member of a threading machine and chamfer the ends of a pipe or conduit to remove the burr from the inside or outside diameter of the pipe or conduit after it has been threaded.

Some reamers, such as those manufactured by Teledyne Landis Machine of Waynesboro, Pennsylvania are designed to chamfer the inside and outside diameter of the pipe or conduit simultaneously. This type of reamer has a fluted body forming longitudinal wings which have an integral rearwardly extending, flat-bottom, generally V-shaped groove in the front portion of each wing. The converging inner sides of the V-groove chamfer the material and the flat-bottom of the V-groove serves as a stop bar at the end of the threading operation by forceably contacting the end of the pipe or conduit sufficient to activate a trip release within the threading machine to release the chamfered piece.

Prior art reamers of this type frequently become worn and require replacement or re-grinding of the cutting surfaces. The suggested method of resharpening or grinding is to grind on the flat side of each wing. This seriously impairs the useful life of the reamer because it reduces the cross section of the wing and changes the geometry of the cutting edges. The thinner reworked wings are often broken because the outer side wall of the flat bottom V-shape is thin and has a vulnerable stress point. The flat bottom tripping surface of the V-groove does not provide a desirable relief angle, and results in chip buildup which often causes damage to the first threads or even tearing off the end of the pipe. The flat bottom tripping surface of the V-groove is perpendicular to the longitudinal axis, and will also often gouge or damage the end of the pipe or conduit when forceable contact is made during the tripping sequence.

Another common problem with chamfering reamers is the down-time or loss of production caused by the necessity of frequent replacement and re-setting of a new reamer.

Other reamers are known in the art. There are several patents which disclose reamers and cutting tools of various configuration.

Press, U.S. Pat. No. 4,016,614 discloses a combination screwdriver and reamer having a blade with a edge for manually deburring the internal diameter of cut conduit or pipe.

Williams, III et al, U.S. Pat. No. 4,682,917 discloses a spade bit which improves the cutting rate and has radial flutes on the lateral shoulders with spurs at the outer ends of the shoulders.

Heule, U.S. Pat. No. 4,165,201 discloses a deburring tool comprising a tool holder with a plurality of knives having cutting edges which contact the bore edge by advancing in a longitudinal direction of the tool holder. The reactive force against one or more of the knives automatically positions the remaining knives longitudinally.

Jackley et al, U.S. Pat. No. 4,134,704 discloses a tapered blade type rotary hole cutter. The blade is generally flat, being tapered in the width direction for applying the taper to the hole, and being tapered in the thickness direction so that the longitudinal cutting edge along its length will lead the cutting edges proximate the point and thereby minimize point drift.

Simonffy, U.S. Pat. No. 3,706,504 discloses a spiral drill having a working end with a plurality of cutting faces, all of which are substantially parallel to the longitudinal axis of the tool and have cutting edges along the forward ends of the faces. A clearance surface is rearwardly disposed at an angle of approximately 45° from each of the cutting faces.

Stillwagon, Jr., U.S. Pat. No. 3,207,196 discloses a boring tool for countersinking recesses in wallboard and driving screws. The tool has four equally spaced wings at the forward end separated by flutes and a countersinking portion extending outwardly and rearwardly from the front for forming screw head recesses in the wallboard. The forward end of the wings are configured to fit a screw head slot and drive the screw.

The present invention is distinguished over the prior art in general, and these patents in particular by a chamfering reamer for reaming the inside diameter of pipe or conduit which has generally cylindrical body with a truncated conical forward end to be received within the inside diameter of a pipe or conduit and a rearward end adapted to be secured in a chaser holder of a threading machine and a plurality of longitudinal flutes extending rearwardly from the forward end defining a plurality of circumferentially spaced longitudinal wings. Each wing has a conical reaming portion to ream the interior diameter at the end of the pipe or conduit and a conical trip shoulder extending from the conical reaming portion to the outer surface of each wing to activate the chaser holder to release the chamfered piece and provide clearance between the end surface of the pipe or conduit being reamed. Another embodiment for simultaneously reaming interior and exterior diameters has a body with the above described features which removably receives a hollow cylindrical sleeve having forwardly extending projections in circumferential alignment with the wings. Each projection has a reaming surface extending inward in opposed relation to the conical reaming portion of the wing to form a plurality of rearwardly extending generally V-shaped, angular bottom grooves which simultaneously ream the interior and exterior diameters at the end of the pipe or conduit. Another embodiment has replaceable inserts on the leading edge of the wing portions.

SUMMARY OF THE INVENTION

It is therefore an object of the present invention to provide a reamer for chamfering the inside and/or outside diameters at the end of a threaded pipe or conduit simultaneously with the threading operation.

It is another object of this invention to provide a reamer for chamfering the inside and/or outside diameters at the end of a threaded pipe or conduit simultaneously with the threading operation which also has a trip shoulder which contacts the end of the pipe or conduit at the end of the threading operation to activate a trip release mechanism within the die head of a threading machine to release the threaded piece.

Another object of this invention is to provide a reamer having a conical reaming portion and a conical trip shoulder at rearward end of the reaming portion wherein the relative angles are such that the tripping force is applied substantially in a radial direction to the interior diameter at the end of the pipe or conduit rather than longitudinally on the end of the pipe or conduit.

Another object of this invention is to provide a reamer having a conical reaming portion for chamfering the inside and/or outside diameters at the end of a threaded pipe or conduit and a trip shoulder to forceably contact the interior diameter at the end of the pipe or conduit without touching the threaded portion.

Another object of this invention is to provide a reamer with a fluted exterior surface defining circumferentially spaced wings having a reaming portion and a trip shoulder which may be easily and repeatedly renewed by grinding when they become worn.

Another object of this invention is to provide a reamer with a fluted exterior surface defining circumferentially spaced wings having a reaming portion and a trip shoulder which are configured to prevent damage to the end of the pipe or conduit during the reaming and tripping operation.

Another object of this invention is to provide a reamer having replaceable cutting inserts on the leading edges of the wings to eliminate the necessity of reworking the cutting surface of the reamer body as they become worn.

Another object of this invention is to provide a reamer having a generally V-shaped conical reaming portion for chamfering the inside and outside diameters at the end of a threaded pipe or conduit simultaneously and an angular trip shoulder at the bottom of the V-shape to forceably contact the interior diameter at the end of the pipe or conduit without touching the threaded portion.

A further object of this invention is to provide a reamer with a fluted exterior surface defining circumferentially spaced wings having a reaming portion and a trip shoulder which may be easily and repeatedly renewed by grinding when they become worn.

A still further object of this invention is to provide a reamer which is simple in construction, inexpensive to manufacture, and is rugged and durable in use.

Other objects of the invention will become apparent from time to time throughout the specification and claims as hereinafter related.

The above noted objects and other objects of the invention are accomplished by a chamfering reamer for reaming the inside diameter of pipe or conduit which has generally cylindrical body with a truncated conical forward end to be received within the inside diameter of a pipe or conduit and a rearward end adapted to be secured in a chaser holder of a threading machine and a plurality of longitudinal flutes extending rearwardly from the forward end defining a plurality of circumferentially spaced longitudinal wings. Each wing has a conical reaming portion to ream the interior diameter at the end of the pipe or conduit and a conical trip shoulder extending from the conical reaming portion to the outer surface of each wing to activate the chaser holder to release the chamfered piece and provide clearance between the end surface of the pipe or conduit being reamed. Another embodiment for simultaneously reaming interior and exterior diameters has a body with the above described features which removably receives a hollow cylindrical sleeve having forwardly extending projections in circumferential alignment with the wings. Each projection has a reaming surface extending inward in opposed relation to the conical reaming portion of the wing to form a plurality of rearwardly extending generally V-shaped, angular bottom grooves which simultaneously ream the interior and exterior diameters at the end of the pipe or conduit. Another embodiment has replaceable inserts on the leading edge of the wing portions.

BRIEF DESCRIPTION OF THE DRAWINGS

FIG. 1 is a schematic side elevation of a die head member of a pipe threading machine having a chamfering reamer installed in the bore.

FIG. 2 is a side elevation of a reamer of the prior art which is designed to chamfer the inside and outside diameter of a pipe or conduit simultaneously.

FIG. 3 is an isometric view of a preferred reamer having a trip shoulder which reams the inside diameter of a pipe or conduit.

FIG. 4 is an isometric view of a preferred two-piece reamer having a trip shoulder and a removable sleeve which reams the inside and outside diameters of a pipe or conduit simultaneously.

FIG. 5 is a side elevation of the reamer of FIG. 3.

FIG. 6 is a front end elevation of the reamer of FIG. 3.

FIG. 7 is a rear end elevation of the reamer of FIG. 3.

FIG. 8 is an side elevation of the two-piece reamer of FIG. 4 with the removable sleeve shown in cross section.

FIG. 9 is a front end elevation of the reamer of FIG. 4.

FIG. 10 is an enlarged front end elevation of a portion of the two-piece reamer of FIG. 4.

FIG. 11 is an enlarged side elevation of a portion of the removable sleeve of the two-piece reamer of FIG. 4.

FIG. 12 is an enlarged front elevation of a portion of one of the sleeve projections showing the inclined reaming surface.

DESCRIPTION OF THE PREFERRED EMBODIMENT

Figure 13:
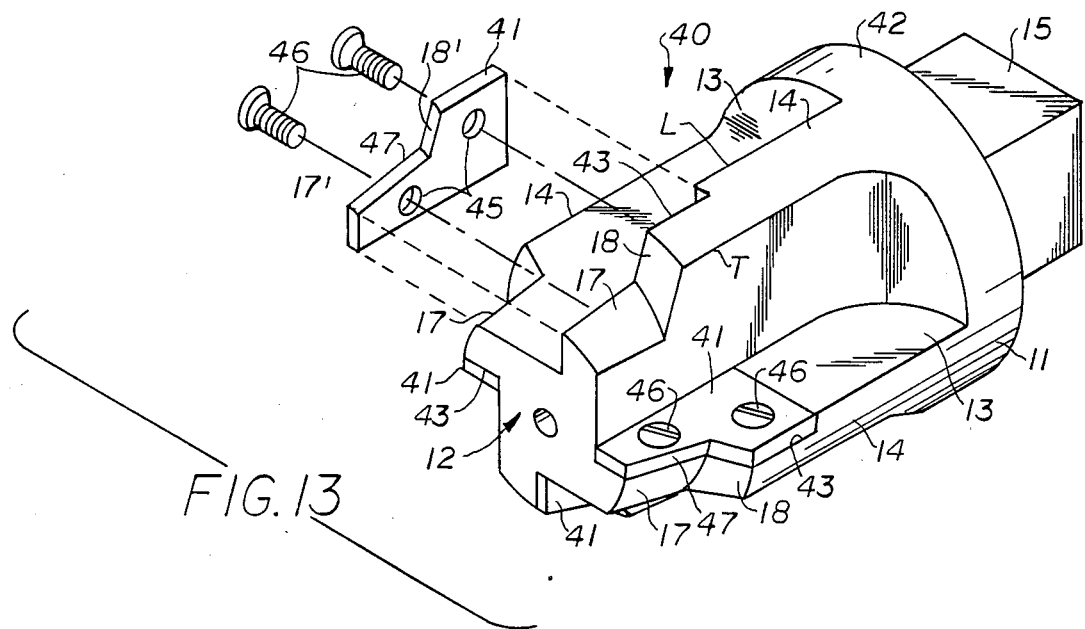
FIG. 13 is an isometric view of a preferred reamer having replaceable inserts on the leading edge of the wing portions.

Referring to the drawings by numerals of reference, there is shown somewhat schematically in FIG. 1, a conventional tripping die head H of a pipe or conduit threading machine having a chamfering reamer R installed in the die head bore. The reamer R has a square tailpiece TP at its rearward end which is received in the end of a driver member D coupled to the spider S of the conventional internal tripping mechanism which opens the jaws of the die head. The reamer tailpiece TP is threadedly received on the forward end of a clamping rod CR. The clamping rod CR positions and clamps the reamer R to the die head H. The reamer R is operatively coupled to the existing tripping die head components and acts as the stop bar for the internal tripping mechanism. As a pipe or conduit is fed into the threading machine, a conventional threading attachment (not shown) cuts threads on the interior or exterior diameter of the pipe or conduit. As the final threads are cut, the pipe or conduit continues to be fed longitudinally into the die head H, to be received on the conical forward end of the reamer R. The conical forward end of the reamer R reams and chamfers the internal and/or external diameter of the pipe or conduit. At the completion of the reaming operation, continued longitudinal movement of the pipe or conduit forces the reamer R rearwardly to actuate the internal trip mechanism or spider to release the jaws from the workpiece.

FIG. 2 shows a typical prior art reamer R which is designed to chamfer the inside and outside diameter of the pipe or conduit simultaneously. This type of reamer is a generally cylindrical configuration having a truncated conical forward end and longitudinal recesses or flutes F which define a plurality of circumferentially spaced wings W. The square or rectangular tailpiece TP at the rearward end of the body is received within the end of a driver D which activates the internal trip mechanism or spider S which opens the die head H. The tailpiece T is internally threaded to receive the clamping rod accessory CR of the threading machine.

Near the conical forward end of the prior art reamer, the front surface of the wings W are provided with a rearwardly extending flat-bottom V-groove G. The angular surface of the conical forward end forms the inner side of the V-shape. The converging sides of the V-shaped groove form the cutting surfaces C which chamfer the end of the pipe or conduit and the flat-bottom B of the V-groove serves as a stop bar or tripping surface which forceably contacts the end of the pipe or conduit at the end of the threading operation to activate a trip release mechanism within the threading machine to release the chamfered piece.

Prior art reamers of this type frequently become worn and require replacement or re-grinding of the cutting surfaces C. The suggested method of resharpening or grinding is to grind on the flat side of each wing W (shown in dotted line). This seriously impairs the useful life of the reamer because it reduces the cross section of the wing and changes the geometry of the cutting edges. The thinner reworked wings are often broken because the outer side wall of the flat bottom V-shape is thin and has a vulnerable stress point. The flat bottom tripping surface B of the V-groove does not provide a desirable relief angle, and results in chip build-up which often causes damage to the first threads or even tearing off the end of the pipe. The flat bottom tripping surface B of the V-groove is perpendicular to the longitudinal axis, and will also often gouge or damage the end of the pipe or conduit when forceable contact is made during the tripping sequence.

Referring now to FIGS. 3 and 4, there are shown two preferred chamfering reamers with trip shoulders. The chamfering reamer 10 shown in FIG. 3 is designed to chamfer only the inside diameter of a pipe or conduit and the embodiment of FIG. 4 is a two-piece reamer 20 designed to chamfer both the inside and outside diameters simultaneously or only the inside diameter.

As seen in FIGS. 3, 5, and 6, the inside diameter reamer 10 comprises a generally cylindrical body 11 having a truncated conical forward end 12 and a plurality of longitudinal recesses or flutes 13 extending rearwardly from the front end defining circumferentially spaced longitudinal wings 14. The diameter of the cylindrical body 11 is sufficient to be received in the bore of the die head of a conventional threading machine. The rearward end of the body 11 is a square or rectangular configuration or tailpiece 15 of sufficient size to be secured in the nipple which activates the internal trip mechanism or spider which opens the die head. The tailpiece 15 is internally threaded 16 to receive the clamping rod accessory of the conventional threading machine.

The exterior of each wing 14 tapers rearwardly and outwardly at an angle relative to the longitudinal axis to form a generally conical reaming portion 17 of smaller diameter than the outer surface of the wings 13. A conical shoulder 18 extends rearwardly and outwardly from the back end of the conical reaming portion 17 to the outer surface of the wings 14 to form a trip shoulder therebetween. The conical reaming portion 17 preferably slopes at an angle of from 10° to 15° relative to the longitudinal axis and the conical shoulder 18 slopes at a greater angle than the conical reaming portion 17, preferably at an angle of from 20° to 30° relative to the vertical axis.

The relative angles of the conical reaming portion 17 and the trip shoulder 18 are such that the forward end of the truncated conical portion 17 will be received within the end of a pipe or conduit and will cut or chamfer the interior diameter at the end of the pipe or conduit as the pipe or conduit is fed thereon without touching the internal threads. Continued feeding of the pipe or conduit will cause its interior diameter to forceably contact the conical surface 17 at its approximate transition with the trip shoulder 18 sufficient to activate the trip mechanism of the die head. The angle of the trip shoulder 18 is sufficient to provide clearance such that it does not contact the end surface of the pipe or conduit.

Thus, the longitudinal tripping force is applied substantially to the interior diameter of the pipe or conduit rather than on the end of the pipe or conduit as is the practice with prior art reamers.

As seen in FIGS. 5 and 6, the preferred reamer has four flutes 14 forming four opposed wings 14, although some sizes may have anywhere from two to six flutes and wings. The wings 14 including the conical reaming portions 17 are offset laterally from the horizontal and vertical axes X and Y. When viewed from the front end (FIG. 6), opposing wings including the conical reaming portion and shoulder portion end each have diametrically opposed flat leading edge surfaces L and flat trailing edge surfaces T spaced generally parallel thereto in a clockwise direction from the leading edge surface. The curve of the reaming portion 17 including the transition point between the conical reaming portion 17 and trip shoulder 18 is formed such that the leading edge L has a large radius r1 and terminates at the clockwise trailing edge T with a smaller radius r2. In other words, the conical surface of the reaming portion 17 is spiraled radially inward from the leading edge to the trailing edge.

As seen from the side (FIG. 5), the spiraled curved surface extending from r1 to r2 also extends forward from a long distance d1 to a shorter distance d2 from the front surface of the conical portion. Thus the clockwise trailing edge surface of the conical reaming portion 17 and trip shoulder 18 is radially smaller than the leading edge and the transition between the angular surfaces is closer to the front of the reamer at the trailing edge than at the leading edge.

In this manner, as the pipe or conduit is fed onto the conical reaming portion, the larger radius leading edge L will serve as a cutting surface to perform any cutting necessary to remove burrs or material which extend radially inward from the interior diameter prior to the tripping operation and the smaller radius trailing edge T will serve as serve as a clearance angle.

As the pipe or conduit continues to be fed onto the conical reaming portion 17, the interior diameter will forceably contact the inwardly spiraled surface of the reaming portion somewhere near the trailing edge since the transition point at r2 is closer to the front at the trailing edge. Thus the longitudinally offset cutting surface provides minimum pipe contact area and a trailing clearance surface to prevent galling, and the inwardly spiraled surface of the reaming portion 17 provides a smooth reaming surface for chamfering the interior diameter and for receiving the tripping force necessary to activate the tripping mechanism.

Referring now to FIGS. 4, and 8–12, there is shown ta two-piece reamer 30 designed to chamfer both the inside and outside diameters simultaneously or only the inside diameter.

The reamer 20 has a generally cylindrical central body 21 which is substantially the same as previously described with reference to FIGS. 3, 5, 6 and 7. In the following description, parts previously described will be assigned the same numerals of reference, but may not be described in detail to avoid repetition.

The front portion of the cylindrical central body 21 has a reduced diameter 22 defining a circumferential flange 23 intermediate its ends. The rearward end of the body 21 is a square or rectangular configuration or tailpiece 15 of sufficient size to be secured in the nipple which activates the internal trip mechanism or spider which opens the die head. The tailpiece 15 is internally threaded 16 to receive the clamping rod accessory of the conventional threading machine. The reduced diameter 32 has a truncated conical forward end 12 and a plurality of circumferentially spaced longitudinal wings 14 separated by recesses or flutes 13 extending rearwardly from the forward end.

The exterior of each wing 14 tapers rearwardly and outwardly at an angle relative to the longitudinal axis to form a generally conical reaming portion 17 of smaller diameter than the outer surface of the wings 13. A conical shoulder 18 extends rearwardly and outwardly from the back end of the conical reaming portion 17 to the outer surface of the wings 14 to form a trip shoulder therebetween. The conical reaming portion 17 preferably slopes at an angle of from 10° to 15° relative to the longitudinal axis and the conical shoulder 18 slopes at a greater angle than the conical reaming portion 17, preferably at an angle of from 20° to 30° relative to the longitudinal axis.

As seen in FIGS. 4 and 8–10, the preferred reamer has four flutes 14 forming four opposed wings 14, although some sizes may have anywhere from two to six flutes and wings. The wings 14 including the conical reaming portions 17 are offset laterally from the horizontal and vertical axes X and Y. When viewed from the front end (FIGS. 9 and 10), opposing wings including the conical reaming portion and shoulder portion end each have diametrically opposed flat leading edge surfaces L and flat trailing edge surfaces T spaced generally parallel thereto in a clockwise direction from the leading edge surface. The curve of the reaming portion 17 including the transition point between the conical reaming portion 17 and trip shoulder 18 is formed such that the leading edge L has a large radius r1 and terminates at the clockwise trailing edge T with a smaller radius r2. In other words, the conical surface of the reaming portion 17 is spiraled radially inward from the leading edge to the trailing edge.

As seen from the side (FIG. 8), the spiraled curved surface extending from r1 to r2 also extends rearward from a longer distance d1 to a shorter distance d2 from the front surface of the conical portion. Thus the clockwise trailing edge surface T of the conical reaming portion 17 and trip shoulder 18 is radially smaller than the leading edge and the transition between the angular surfaces is closer to the front of the reamer at the trailing edge than at the leading edge.

A hollow cylindrical sleeve 24 having a central bore 25 is slidably received on the reduced diameter 22. A plurality of circumferentially spaced threaded holes 26 are formed in the reduced diameter 22 forward of the flange 23 and a plurality of corresponding holes 27 are formed in the sleeve 24. The sleeve 24 is removably secured to the central body 21 by installing screws 28 in the holes 26 and 27. Another hole 29 is provided through the side wall of the sleeve 24 in alignment with the terminal end of the flutes 13 to receive a rod-like tool for prying the sleeve off the central body should it become stuck. The outer diameter of the cylindrical sleeve 24 and flange 23 of the central body 21 are of sufficient size to be received in the bore of the die head of a conventional threading machine.

The forward end of the sleeve 24 has a plurality of circumferentially spaced cut-outs 30 extending rearwardly to define a plurality of projections 31. The interior surface of each projection 31 has a flat surface extending outwardly from the central bore 25 at an angle relative to the longitudinal axis to form a reaming surface 32. The preferred angle of the reaming surface 32 is from 10° to 15° relative to the longitudinal axis. The distance between the outer ends of the reaming surfaces 32 is greater than the exterior diameter of the pipe or conduit being reamed and the inner end of the reaming surface where it joins the central bore 25 is smaller than the exterior diameter of the pipe or conduit.

The preferred sleeve 24 has four projections 31 offset laterally from the horizontal and vertical axes X and Y, but may have anywhere from two to six. When viewed from the front end (FIGS. 9 and 10), opposing projections each have diametrically opposed flat leading edge surfaces L and flat trailing edge surfaces T spaced generally parallel thereto in a clockwise direction from the leading edge surface. As shown in FIG. 12, the flat reaming surfaces 32 are also formed at an angle relative to the central axis of the sleeve such that the clockwise leading edge L is a short radial distance d3 from the central axis and terminates at the clockwise trailing edge at a longer radial distance d4 from the center. In other words, the inclined reaming surface 32 extends outwardly from the leading edge L to the trailing edge T at an angle relative to the central axis of the sleeve.

When the sleeve 24 is properly installed on the central body 21, the projections 31 are aligned with the wings 14 and the juncture of the reaming surfaces 32 with the central bore 25 are disposed at the juncture of the shoulders 18 with the wings 14. Thus, when viewed from the side (FIG. 8), the assembled angular surfaces form a rearwardly extending V-groove G with an outwardly and rearwardly extending angular bottom 18. The inwardly spiral conical reaming surface 17 of the central body 21 forms the inner side of the V-shape, the conical shoulder 18 forms the bottom, and the flat sloping reaming surface 32 of the sleeve 24 forms the outer side of the V-shape.

The relative angles of the conical reaming portion 17, the trip shoulder 18, and the reaming surface 32 are such that as the pipe or conduit is fed onto the reamer, the forward end of the truncated conical portion 17 will receive the end the pipe or conduit and continued feeding will cause contact of the interior and exterior diameters at the end of the pipe or conduit to contact the converging sides (leading edge L) of the angular bottom V-shaped groove sufficient to simultaneously ream the interior and exterior diameters. Continued feeding of the pipe or conduit will cause its interior diameter to forceably contact the conical surface 17 near its transition with the trip shoulder 18 (near the trailing edge T) sufficient to activate the trip mechanism of the die head. The angle of the trip shoulder 18 is sufficient to provide clearance such that it does not contact the end surface of the pipe or conduit.

Thus, the longitudinal tripping force is applied substantially to the interior diameter of the pipe or conduit rather than on the end of the pipe or conduit as is the practice with prior art reamers.

Since the conical reaming portions 17 are spiraled radially inward from the leading edge to the trailing edge and the flat reaming surfaces 32 extend outwardly from the leading edge to the trailing edge, the angular bottom V-shaped groove G is wider at the clockwise trailing edge than at the leading edge. As described previously, the transition between the conical reaming portion 17 of the central body and shoulder 18 is closer to the front of the reamer at the trailing edge T than at the leading edge L.

Thus the V-shaped groove G provides minimum pipe contact area and a trailing clearance surface to prevent galling, and the interior and exterior diameter of the pipe or conduit will forceably contact the inwardly spiraled surface of the reaming portion somewhere near the trailing edge.

The outer sleeve 24 may be removed from the central body 21 and the central body used as an interior diameter reamer to ream the interior diameter of pipe or conduit as previously described. The removable feature allows either the sleeve 24 or central body 21 to be replaced should one of them become unusable. This feature also allows either piece to be reground or reworked independently.

Because there is no integral shoulder on the exterior of the central body 21 or the body of the one-piece reamer 10, the present reamer design provides a relatively large outside wing contour which can be easily renewed by grinding on the exterior longitudinal surfaces (FIG. 5). The wing configuration of the present reamer provides significantly more grinding stock limited only to its usable length which is several times greater than the amount allowed in the width of the wing of prior art reamers (FIG. 2).

Figure 14:
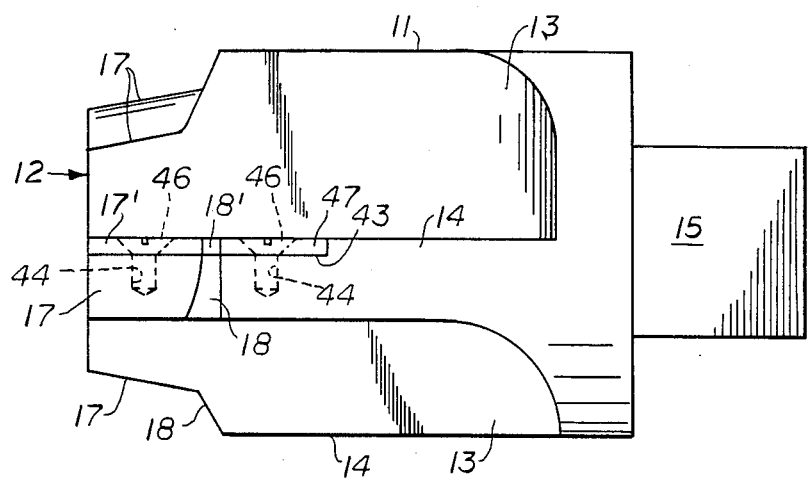
FIG. 14 is a side elevation of the reamer of FIG. 13.

Referring now to FIGS. 13 and 14, there is shown an inside diameter reamer 40 which utilizes replaceable cutter inserts 41 on the leading edged surfaces. The reamer 40 has a generally cylindrical body 42 which is substantially the same as previously described with reference to FIGS. 3, 5, 6 and 7. In the following description, parts previously described will be assigned the same numerals of reference, but may not be described in detail to avoid repetition.

In this modification, a flat recess 43 is milled in the flat leading edge surfaces L of the wings 14. The recess 43 extends rearwardly a distance from the front surface of the body 42 and inwardly from the leading edge side. A pair of threaded holes 44 extend inwardly from the leading edge side.

The body 42 has the previously described truncated conical forward end 12, a plurality of circumferentially spaced longitudinal wings 14 separated by recesses or flutes 13 extending rearwardly from the forward end. Each wing 14 has the previously described conical reaming portion 17, and conical shoulder 18.

Each insert 41 is a flat generally rectangular plate preferably formed of hardened steel and has a pair of holes 45 therethrough which receive the head portion of screws 46 whose shank portions pass therethrough to be threadedly received in the holes 44 for securing the inserts 41 within the recesses 43. The outer surface 47 the insert 41 corresponds to the periphery of the front portion of the wings 14 and has a thin conical reaming portion 17' forming an extension of the conical reaming portion 17' and a conical shoulder portion 18' forming an extension of the conical shoulder 18.

The curve of the reaming portion 17' including the transition point between the conical reaming portion 17 and shoulder 18' forms an extension of the curvature of the corresponding reaming portion 17 and shoulder portion 18 on the body 42. In other words, the conical surface of the insert reaming portion 17' is spiraled radially inward from the leading edge to the trailing edge, and similarly, the inwardly spiraled curved surface of the insert 42 also extends rearward from a long distance to a shorter distance from the front surface of the insert to match the corresponding surface on the body.

The inserts 41 may be easily and quickly replaced as they become worn by removing the screws. This feature eliminates the necessity of having to rework the cutting surface of the wings.

Figure 15:
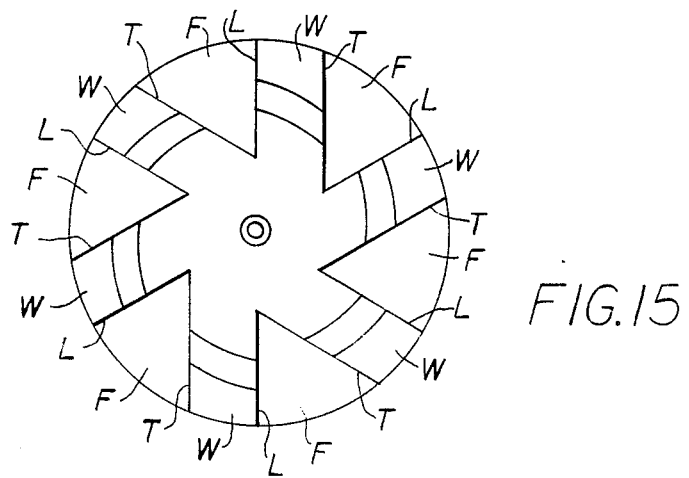
FIG. 15 is a front end elevation of a reamer having six flutes and wings.

FIG. 15 is a front view of a reamer having six flutes F forming four opposed wings W. Opposing wings W including the conical reaming portions and shoulder portions each have diametrically opposed flat leading edge surfaces L and flat trailing edge surfaces T spaced generally parallel thereto in a clockwise direction from the leading edge surface. The other features of the reamer are described in considerable above and will not be repeated to avoid repetition.

While this invention has been described fully and completely with special emphasis upon a preferred embodiment, it should be understood that within the scope of the appended claims the invention may be practiced otherwise than as specifically described herein.

I claim:

1. A reaming tool for reaming the end of a pipe or conduit comprising;
    a generally cylindrical body having a truncated conical forward end to be received within the inside diameter of a pipe or conduit and a rearward end adapted to be secured in a tool holder and a plurality of longitudinal flutes extending rearwardly from the forwardly end defining a plurality of circumferentially spaced longitudinal wings,
    each said wing having a tapered front portion extending rearward and outward at an angle relative to the longitudinal axis to form a generally conical reaming portion having a maximum diameter smaller than the outer diameter of said wings but sufficiently large enough to ream the interior diameter at the end of the pipe or conduit received thereon, each said wing having a generally conical shoulder portion extending rearward and outward from the conical reaming portion to the outer surface of said wing at greater angle relative to the longitudinal axis than said conical reaming portion to provide angular clearance between the end surface of the pipe or conduit being reamed, said front and shoulder portions viewed from the front end having a flat leading edge surface and a flat trailing edge surface spaced in a clockwise direction from the leading edge surface and said conical reaming portion extending therebetween, and said leading edge surface when viewed from the front end having a radius larger that the radius of said trailing edge surface such that said conical reaming surface therebetween curves in a radially inward spiral from said leading edge to said trailing edge.

2. The reamer according to claim 1 in which said wings including the tapered front and shoulder portions viewed from the front end each have diametrically opposed flat leading edge surfaces and a flat trailing edge surface spaced generally parallel thereto in a clockwise direction from said leading edge surface.

3. The reamer according to claim 2 in which the leading edge surface of each said wing has a flat recess extending rearwardly a distance from its front surface and inwardly from the leading edge side, and each said wing is provided with a replaceable cutter insert member removably secured within said recess, each said insert having an outer surface corresponding to the periphery of the front portion of said wing conical reaming portion and said conical shoulder portion forming a complementary extension thereof.

4. The reamer according to claim 1 in which the transition point between said conical reaming surface and said conical shoulder portion at said trailing edge surface is closer to the front of the reamer body than at said leading edge surface, such that said leading edge surface of said conical reaming portion and shoulder portion is radially larger than said trailing edge and the transition between the conical surfaces is closer to the front of the reamer at said trailing edge than at said leading edge, whereby said leading edge will serve as a cutting surface to remove burrs or material which extend radially inward from the interior diameter of a pipe or conduit being fed onto said spiral conical reaming portion, and continued feeding of the pipe or conduit onto said conical reaming portion will forceably contact the interior diameter with said inwardly spiraled conical reaming surface at a point near said trailing edge surface to ream the interior diameter of said pipe or conduit.

5. The reamer according to claim 4 in which said reamer is installed in the bore of the die head of a threading machine and the rearward end is received within the end of a nipple which activates an internal trip mechanism to open the die head, and still further continued feeding of the pipe or conduit after the reaming operation will cause its interior diameter to forceably contact said inwardly spiral conical reaming surface near its transition with the conical shoulder sufficiently to activate the trip mechanism of the die head, whereby the tripping force is applied substantially in a radial direction to the interior diameter at the end of the pipe or conduit and the angle of the conical shoulder relative to the longitudinal axis provides sufficient clearance such that it does not normally contact the end surface of the pipe or conduit during the tripping operation.

6. The reamer according to claim 1 in which the angle of said wing front portion is approximately from 10° to 15° relative to the longitudinal axis.

7. The reamer according to claim 1 in which the angle of said wing conical shoulder is approximately from 20° to 30° relative to the vertical axis.

8. The reamer according to claim 1 in which the angle of said wing front portion is approximately from 10° to 15° relative to the longitudinal axis, and the angle of said wing conical shoulder is approximately from 20° to 30° relative to the vertical axis.

9. A reaming tool for simultaneously reaming the inside and outside diameters at the end of a pipe or conduit comprising;

a generally cylindrical body having a truncated conical forward end to be received within the inside diameter of a pipe or conduit and a rearward end adapted to be secured in a tool holder and a plurality of longitudinal flutes extending rearwardly from the forward end defining a plurality of circumferentially spaced longitudinal wings, each said wing having a tapered front portion extending rearward and outward at an angle relative to the longitudinal axis to form a generally conical reaming portion having a maximum diameter smaller than the outer diameter of said wings but sufficiently large enough to ream the interior diameter at the end of the pipe or conduit received thereon, each said wing having a generally conical shoulder portion extending rearward and outward from the conical reaming portion to the outer surface of said wing at a greater angle relative to the longitudinal axis than said conical reaming portion to provide angular clearance between the end surface of the pipe or conduit being reamed, and a hollow cylindrical sleeve having a central bore slidably received and removably secured on said body and a plurality of forwardly extending projections in radial alignment with said wings, each said projection having a tapered front portion extending rearward and inward at an angle relative to the longitudinal axis to form a generally flat reaming surface in opposed angular relation to said conical reaming portion of said body to receive and ream the outer diameter at the end of the pipe or conduit as said conical reaming portion reams the interior diameter.

10. The reamer according to claim 9 in which said sleeve projections are radially aligned with said wings and the juncture of said flat reaming surfaces with the central bore are disposed at the juncture of said conical shoulders with said wings to cooperatively form a rearwardly extending generally V-shaped groove having an outwardly and rearwardly extending angular bottom, said conical reaming surface of said body forming the inner side of the V-shape groove, said conical shoulder forming the angular bottom, and said flat reaming surface of said sleeve forming the outer side of the V-shape groove, whereby the interior and exterior diameters at the end of a pipe or conduit being fed into the V-shape will be reamed simultaneously.

11. The reamer according to claim 10 in which
said wings including the tapered front and shoulder portions viewed from the front end each have diametrically opposed flat leading edge surfaces and a flat trailing edge surface spaced generally parallel thereto in a clockwise direction from said leading edge surface.

12. The reamer according to claim 11 in which
said sleeve has a plurality of diametrically opposed circumferentially spaced projections corresponding to said wings, and said opposing projections viewed from the front end each have diametrically opposed flat leading edge surfaces and a flat trailing edge surface spaced generally parallel thereto in a clockwise direction from said leading edge surface and said flat reaming surface extending therebetween.

13. The reamer according to claim 12 in which
said flat reaming surface is formed at an angle relative to the central axis of said sleeve such that the leading edge is a small radial distance from the central axis and terminates at the clockwise trailing edge at a larger radial distance from the central axis.

14. The reamer according to claim 11 in which
said leading edge surface of said opposed wings when viewed from the front end has a radius larger than the radius of said trailing edge surface such that said conical reaming surface therebetween curves in a radially inward spiral from said leading edge to said trailing edge.

15. The reamer according to claim 14 in which
said flat reaming surface is formed at an angle relative to the central axis of said sleeve such that the leading edge is a smaller radial distance from the central axis and terminates at the trailing edge at a larger distance from the central axis.

16. The reamer according to claim 14 in which
the transition point between said conical reaming surface and said conical shoulder portion at said trailing edge surface of said wings is closer to the front of the reamer body than at said leading edge surface, such that said leading edge surface of said conical reaming portion and shoulder portion is radially larger than said clockwise trailing edge and the transition between the conical surfaces is closer to the front of the reamer at said trailing edge than at said leading edge, whereby said leading edge of said conical reaming surface will serve as an interior cutting surface to remove burrs of material which extend radially inward from the interior diameter of a pipe or conduit being fed onto said spiral conical reaming portion, and said leading edge of said flat reaming surface will serve as an exterior cutting surface to remove burrs or material which extend radially outward from the exterior diameter of the pipe or conduit, and whereby continued feeding of the pipe or conduit onto said conical reaming portion will forceably contact the interior diameter of the pipe or conduit with said inwardly spiraled conical reaming surface of said body and the exterior diameter of the pipe or conduit with said flat reaming surface of said sleeve at a point near their said trailing edge surfaces to simultaneously ream the interior and exterior diameters of said pipe or conduit.

17. The reamer according to claim 16 in which
said reamer is installed in the bore of a tripping die head of a threading machine with its rearward end operatively received within the end of the driver member which activates the internal trip mechanism to open the die head, and still further continued feeding of the pipe or conduit after the reaming operation will cause its interior diameter to forceably contact said inwardly spiral conical reaming portion near its transition with said conical shoulder sufficiently to active the trip mechanism of the die head, whereby the tripping force is applied substantially to the interior diameter of the pipe or conduit and the angle of said conical shoulder relative to the vertical axis provides sufficient clearance such that it does not normally contact the end surface of the pipe or conduit during the tripping operation.

18. The reamer according to claim 9 in which
the angle of said wing conical reaming portion is approximately from 10° to 15° relative to the longitudinal axis.

19. The reamer according to claim 9 in which
the angle of said wing conical shoulder is approximately from 20° to 30° relative to the vertical axis.

20. The reamer according to claim 9 in which
the angle of said wing front portion is approximately from 10° to 15° relative to the longitudinal axis, and
the angle of said wing conical shoulder is approximately from 20° to 30° relative to the vertical axis.

21. The reamer according to claim 9 in which
the angle of said sleeve flat reaming surface is approximately from 10° to 15° relative to the longitudinal axis.

22. The reamer according to claim 9 in which
the angle of said sleeve flat reaming surface is approximately from 0° to 10° relative to the center of said sleeve.

23. The reamer according to claim 9 in which
the angle of said sleeve flat remaining surface is approximately from 10° to 15° relative to the longitudinal axis, and
the angle of said sleeve flat reaming surface is approximately from 0° to 10° relative to the center of said sleeve.

* * * * *